Sept. 29, 1959 D. C. PORTER 2,906,068
ATTACHMENT FASTENING
Filed Aug. 4, 1958
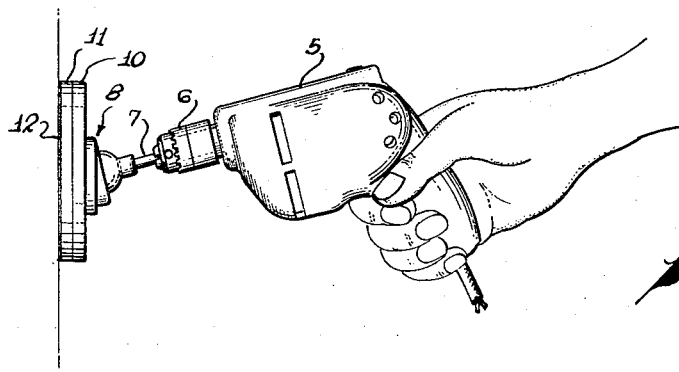
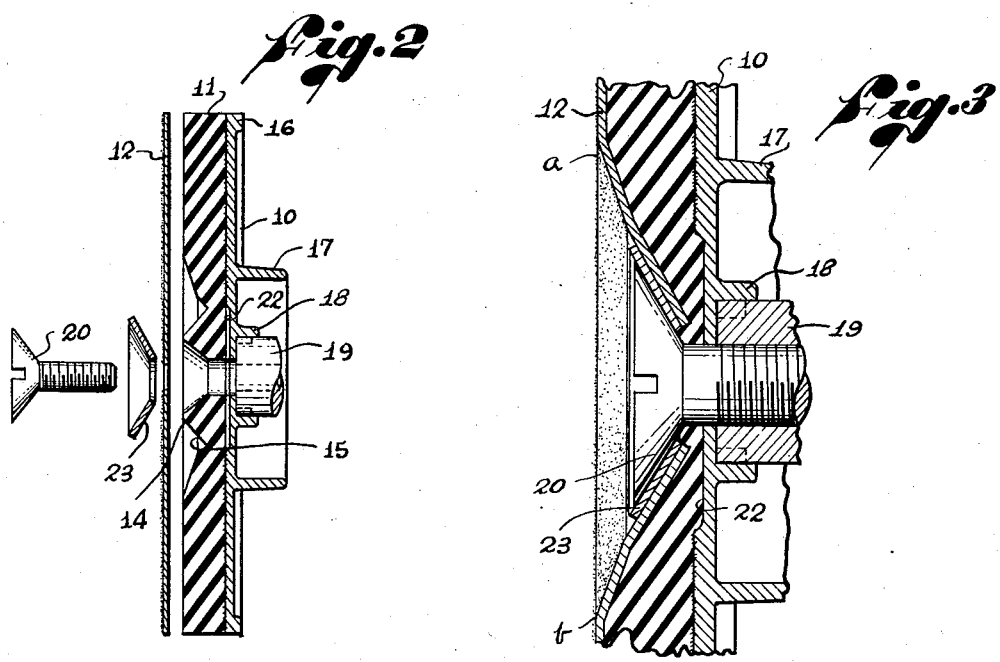
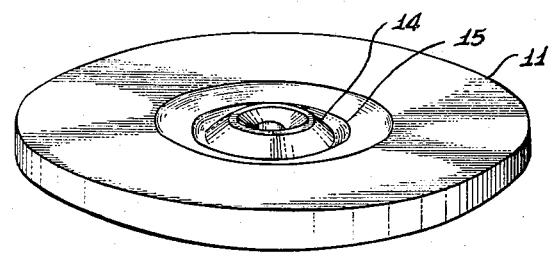
INVENTOR.
DONALD C. PORTER
BY
Attorney

United States Patent Office 2,906,068
Patented Sept. 29, 1959

---

2,906,068

ATTACHMENT FASTENING

Donald C. Porter, Covina, Calif., assignor to Warren E. Swarthout, Arcadia, Calif.

Application August 4, 1958, Serial No. 752,842

5 Claims. (Cl. 51—197)

This invention relates to couplings or fastenings between elements and particularly to a fastening between a rigid metal element, a resilient element mounted thereon, and working material, such as an abrasive disc.

In my patent application, Serial No. 672,029, filed July 15, 1957, entitled "Universal Joint," now Patent No. 2,-854,829, of October 7, 1958, I disclose and claim a sanding or buffer attachment for a hand power drill, the application being primarily directed to the universal joint between the drill and the work disc. The fastening shown in this pending application includes a metal backing plate with a surface which is flat over the entire plate, an intermediate rubber plate between the metal plate, a sandpaper sheet when used for sanding, a washer and a screw. The plates and sheet are in the form of discs.

The construction of the rubber and metal discs of the prior invention made it difficult to always position the head of the attaching screw below the working surface of the sandpaper. This was because the rubber disc was glued over its entire surface to the flat surface of the metal disc making it difficult for the rubber to yield sufficiently to permit the flat surface of the head of the fastening screw to be positioned below the working surface of the sandpaper. The present invention overcomes this difficulty by a new construction of both the metal backing disc and the resilient rubber disc between the sandpaper and backing disc. This new construction permits the center of the rubber disc to be easily deformed while securely holding the sandpaper in position.

The principal object of the invention, therefore, is to facilitate the attachment of a working sheet to a rotatable unit.

Another object of the invention is to provide an improved attachment between a sandpaper disc and a resilient driving member for the disc.

Another object of the invention is to provide an improved construction of a rotatable backing plate and a resilient disc for mounting a sandpaper disc thereon.

A better understanding of this invention may be had from the following detailed description when read in connection with the accompanying drawings, in which:

Fig. 1 is an elevational view of a power sander embodying the invention.

Fig. 2 is a view, partly exploded and in cross section, showing the elements of the invention before assembly.

Fig. 3 is a cross-sectional view showing the elements of the invention in assembly; and Fig. 4 is a perspective view of the resilient disc element of the invention.

Referring, now, to the drawings in which the same reference numerals indicate the same elements, a hand power unit 5 having a chuck 6 is shown connected through a shaft 7 with a universal joint 8 of the type disclosed and claimed in the above-mentioned pending application. To a backing plate 10 is glued a resilient element 11 to which is attached a sandpaper disc 12. The resilient disc 11 may be of rubber or similar material and, as shown in Fig. 4, has an annular conical ridge portion 14 with a trough portion 15. The metal backing disc 10 has an outer rim flange 16, an intermediate flange 17, and an inner flange 18 within which is mounted a drive shaft 19, this shaft being internally threaded to accommodate the threads of a screw 20. The disc 10 has a recessed portion 22 so that when the resilient disc 11 is glued to the metal plate 10, the glued surfaces are outside of the recess 22.

Now, when the screw 20 is threaded into the shaft 19, a frusto-conical washer 23 being positioned between the frusto-conical portion of the head of the screw 20 and the inner surface of frusto-conical portion 14 of the disc 11, the frusto-conical portion 14 will be deformed and the rubber opposite the recess 20 will be pressed into the recess so that the assembled elements will be as shown in Fig. 3. This permits the surface of the head of the screw 20 to be easily positioned considerably below the working surface of the sandpaper 12, which will extend outside of the circle indicated by points "a" and "b."

The rubber is easily deformed by spreading perpendicularly to the axis of the screw 20 because the portion over the recess 22 is not glued to the disc 10. This construction, therefore, permits a more rapid attachment and interchangeability of abrasive disc such as 12, while insuring a firm attachment of the paper to the disc 11 and making certain that the surface of the head of the screw 20 is below the working surface of the sandpaper. By concentrating the pressure on the abrasive disc by the frusto-conical configuration of the rubber disc and of the washer 23, a better driving contact for the abrasive disc is obtained.

I claim:

1. An assembly construction of a backing plate, a resilient plate and a work sheet comprising an annular, rigid backing plate having a flat surface and an annular recessed center portion, said recessed center portion having a surface in a plane parallel with said flat surface of said backing plate, a resilient plate fixedly attached to said flat surface of said rigid backing plate except said surface of said recessed portion of said backing plate, said resilient plate having a central frusto-conical ridge and trough section opposite said surface of said recess in said rigid backing plate, a work sheet on said resilient plate, and means for holding said work sheet on said resilient plate, said means deforming the frusto-conical ridge section of said resilient plate into the recess of said rigid plate.

2. An assembly construction in accordance with claim 1 in which said resilient plate is a disc of rubber.

3. An assembly construction in accordance with claim 1 in which said last-mentioned means includes a frusto-conical washer and a frusto-conical headed screw, said work sheet being held between said washer and the frusto-conical section of said resilient plate.

4. An assembly construction in accordance with claim 1 in which an internally threaded drive shaft is attached to said rigid backing plate, said last-mentioned means including a frusto-conical washer adapted to hold said work sheet in contact with said frusto-conical ridge section of said resilient plate and a frusto-conical headed screw adapted to be threaded into said shaft.

5. An abrasive disc fastening comprising a metal disc adapted to be rotated, said disc having a flat surface and an annular centrally disposed recess therein having a surface parallel with said flat surface of said metal disc, a resilient disc having a flat surface glued to said flat surface of said metal disc except the flat surface of said recess, said resilient disc having a centrally disposed frusto-conical portion opposite said recess, and a frusto-conical screw and washer means for holding said abrasive disc in contact with said frusto-conical portion of said resilient disc, said frusto-conical portion being deformed and the portion of said resilient disc opposite said recess being held in said recess by said screw and washer means.

References Cited in the file of this patent

UNITED STATES PATENTS

| | | |
|---|---|---|
| 1,778,471 | Stratford | Oct. 14, 1930 |
| 1,938,493 | Myers | Dec. 5, 1933 |
| 2,114,967 | Myers | Apr. 19, 1938 |
| 2,370,323 | Patt | Feb. 27, 1945 |